(12) United States Patent
Roberts et al.

(10) Patent No.: US 10,023,403 B2
(45) Date of Patent: Jul. 17, 2018

(54) PALLET HANDLING

(71) Applicant: System Logistics Corporation, Ada, MI (US)

(72) Inventors: Matthew H. Roberts, Arden, NC (US); Ray B. Briggs, Asheville, NC (US); Jackie E. King, Leicester, NC (US)

(73) Assignee: System Logistics Corporation, Ada, MI (US)

( * ) Notice: Subject to any disclaimer, the term of this patent is extended or adjusted under 35 U.S.C. 154(b) by 0 days.

(21) Appl. No.: 15/513,038

(22) PCT Filed: Sep. 22, 2015

(86) PCT No.: PCT/US2015/051380
§ 371 (c)(1),
(2) Date: Mar. 21, 2017

(87) PCT Pub. No.: WO2016/048977
PCT Pub. Date: Mar. 31, 2016

(65) Prior Publication Data
US 2017/0247202 A1    Aug. 31, 2017

Related U.S. Application Data

(60) Provisional application No. 62/053,314, filed on Sep. 22, 2014.

(51) Int. Cl.
*B65G 1/04* (2006.01)
*B65G 59/06* (2006.01)
(Continued)

(52) U.S. Cl.
CPC ......... *B65G 59/068* (2013.01); *B65G 17/002* (2013.01); *B65G 37/00* (2013.01)

(58) Field of Classification Search
USPC ....... 198/346.1, 463.3, 809, 867.08; 29/33 P, 29/786, 793, 794; 414/222.07, 239, 253,
(Continued)

(56) References Cited

U.S. PATENT DOCUMENTS

| | | | | |
|---|---|---|---|---|
| 1,830,740 A | * | 11/1931 | Leech | ...................... B61D 3/20 |
| | | | | 414/396 |
| 3,269,565 A | * | 8/1966 | Kemp, Jr. | ................ B65G 1/00 |
| | | | | 414/21 |

(Continued)

FOREIGN PATENT DOCUMENTS

| | | |
|---|---|---|
| DE | 102011010983 A1 | 8/2012 |
| FR | 73.16537 | 12/1973 |
| GB | 957236 A | 5/1964 |

OTHER PUBLICATIONS

PCT International Search Report; PCT/US2015-051380; dated Jan. 13, 2016; European Patent Office.

(Continued)

*Primary Examiner* — Gregory W Adams
(74) *Attorney, Agent, or Firm* — The Van Winkle Law Firm; William G. Heedy; David M. Carter

(57) ABSTRACT

PA system (20) for removing pallets (22) from carriers (24) may include an infeed conveyor (30) configured for conveying carriers with pallets, a pallet takeaway conveyor (34) configured for conveying pallets, and a removal conveyor (32) between the infeed conveyor and the pallet takeaway conveyor. The removal conveyor is configured for removing the pallets from the carrier, the removal conveyor driven in synchronicity with the infeed conveyor so as to remove the pallets with continuous motion.

22 Claims, 11 Drawing Sheets

(51) Int. Cl.
*B65G 17/00* (2006.01)
*B65G 37/00* (2006.01)

(58) Field of Classification Search
USPC ..... 414/279, 285, 331.07, 395, 400, 416.01, 414/416.05, 416.09, 416.11, 416.12, 495, 414/498, 499, 608, 797.2, 797.6, 927–929
See application file for complete search history.

(56) References Cited

U.S. PATENT DOCUMENTS

| | | | | |
|---|---|---|---|---|
| 4,470,742 A * | 9/1984 | Schindler | ............ | B65G 1/0478 414/286 |
| 4,636,129 A * | 1/1987 | Lanham, Jr. | ............ | A21C 15/00 198/465.1 |
| 4,715,766 A * | 12/1987 | Gebhardt | ............ | B65G 1/0485 198/468.6 |
| 5,018,926 A | 5/1991 | Sternad | | |
| 5,054,992 A * | 10/1991 | Hognestad | ............ | B65G 47/34 198/867.08 |
| 5,063,648 A * | 11/1991 | Yonezawa | ............ | B23Q 3/1556 100/918 |
| 6,652,213 B1 * | 11/2003 | Mitchell | ............ | B65G 1/0492 414/279 |
| 7,686,560 B2 * | 3/2010 | Laurin | ............ | B65G 1/0407 198/469.1 |
| 8,047,756 B2 * | 11/2011 | Tuffs | ............ | B60L 15/38 198/463.3 |
| 8,251,634 B2 * | 8/2012 | Kauhanen | ............ | B65G 67/20 108/57.15 |
| 9,249,001 B2 * | 2/2016 | Lalesse | ............ | B65G 1/0407 |
| 2007/0276535 A1 | 11/2007 | Haag | | |

OTHER PUBLICATIONS

Written Opinion of the International Search Authority; PCT/US2015-051380; dated Jan. 13, 2016; European Patent Office.

* cited by examiner

PALLET HANDLING

CROSS-REFERENCE TO RELATED APPLICATIONS

This application relies for priority on U.S. Provisional Patent Application Ser. No. 62/053,314, entitled "PALLET HANDLING," filed Sep. 22, 2014, the entire content of which is hereby incorporated by reference in its entirety.

TECHNICAL FIELD

The present disclosure relates generally to handling items grouped in palletized loads.

BACKGROUND

Warehousing and distribution facilities have grown in importance in the supply chain in recent years. In such facilities, large warehouses are used to collect and store many types of goods at a central location for shipment by truck to one or more locations, typically retail locations. Goods may be stored in the warehouse by pallet load or individually, and goods may be shipped either by uniform pallet, mixed pallet, or otherwise.

There are many sizes of pallets in use for carrying goods such as groceries or beverages. Some pallets are assembled from pieces of wood, and some are made from a unitary piece of plastic, for example by injection molding. Many conventional pallets are square or substantially square. For example, the International Organization for Standardization (ISO) recognizes standard pallet sizes of 36×36 inches, 42×42 inches, 40×40 inches, 40×48 inches, etc. Many other sizes exist.

Recently, smaller substantially-rectangular pallets have become more common. For example, 48×20 inch pallets are ISO-recognized. Other pallets have widths of 18.5 inches and lengths from 43 to 53 inches. Such smaller pallets have roughly half the footprint of a typical pallet, and they are accordingly often referred to as "half-pallets." FIGS. 13 and 14 show two conventional half-pallet designs.

Due to their narrower width and lighter weight as compared to full-sized pallet loads, half-pallet loads can be easier to load onto and unload from a delivery truck, to load onto a handtruck, and to move into a store. For example, a delivery person might place a half-pallet load onto a specialized handtruck, walk the load through a door of a retail location, and perhaps through a further door into a walk-in refrigerated area. The half-pallet and its load can then be deposited at the desired location. Such maneuverability may not be possible with full loads for several reasons, such as the extra equipment (a forklift) needed to lift the pallet load, the load being larger than a door through which it must go, the load being too heavy to manipulate without de-palletizing, the location not requiring a full pallet load of particular goods, etc.

Half-pallets are typically formed with at least one widthwise and lengthwise groove in their bottom sides for receiving forks of a lift or handtruck. Typically, two parallel grooves are provided extending in a widthwise direction and one in a lengthwise direction. Because of such discontinuous bottom surface, half-pallet loads are often carried through conveying systems on planar carriers to improve stability. FIGS. 13 and 14 show two such conventional half-pallets 22' and 22" on carriers 24' and 24", each half-pallet having widthwise grooves 26' and 26" and a lengthwise groove 28' and 28". As illustrated, the half-pallets are unitarily-molded plastic structures, and the carriers are constructed from pieces of wood.

When half-pallet loads are to be removed from a conveying system, for example for loading onto a truck or rack storage system, the half-pallet loads are removed from the carriers and transferred to a load take-away conveyor or the like. The carriers are then directed to a carrier take away conveyor, typically for reuse within the system.

To remove half-pallet loads from carriers in some existing automated systems, the carriers with the half-pallet loads are driven to an unloading position and then stopped. Two fork arms attached to a laterally-movable gantry or the like are then inserted above the carrier and beneath the half-pallet into the widthwise grooves of the half pallet. The fork arms then lift the half-pallet load and place it on an outfeed conveyor or the like while the carrier is moved away on another conveyor. This stopping, lifting, and placing can be a bottleneck in the system that slows throughput as compared to other points in the system.

Accordingly, systems, methods and devices that improve the overall throughput of palletized loads, including half-pallet loads, and/or their removal from carriers, or that provide other benefits, would be welcome.

SUMMARY

Aspects and advantages of the invention will be set forth in part in the following description, or may be apparent from the description, or may be learned through practice of the invention.

According to certain aspects of the invention, a system is disclosed for removing pallets from carriers. The system may include an infeed conveyor configured for conveying carriers with pallets on the carriers, a pallet takeaway conveyor configured for conveying pallets, and a removal conveyor between the infeed conveyor and the pallet takeaway conveyor. The removal conveyor is configured for removing the pallets from the carriers and transferring the pallets to the pallet takeaway conveyor. The removal conveyor is driven in synchronicity with at least a portion of the infeed conveyor so as to remove the pallets with continuous motion. Various options and modifications are possible.

According to certain other aspects of the disclosure, a conveyor is disclosed for removing a pallet from a carrier, the pallet having a bottom side defining two spaced-apart grooves. The conveyor may include a frame, a first belt mounted on the frame, and a second belt mounted on the frame. The belts may each have a width sized to fit within a respective one of the grooves, and may be driven along paths including a lifting portion. The lifting portions may extend parallel to each other and spaced apart so that the lifting portions can simultaneously fit within the grooves. A drive may be provided for driving the first and second belts so as to support the pallet on the first and second belts and remove it from the carrier. Again, various options and modifications are possible.

According to certain other aspects of the disclosure, a method of removing pallets from carriers may include the steps of: transporting pallets atop carriers on a first conveyor; removing the pallets from the carriers using a using a removal conveyor driven at substantially the same speed as the first conveyor; and transferring the pallets from the removal conveyor to a load takeaway conveyor. Various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention is set forth in the specification, which makes reference to the appended figures, in which:

FIGS. 8-12 are sequential schematic top views of the system of FIG. 1, in which FIG. 8 shows a pallet and carrier entering the system on a first portion of an infeed conveyor;

FIG. 9 shows the pallet and carrier reaching an alignment stop area of the infeed conveyor where the pallet and carrier change direction;

FIG. 10 shows the pallet and carrier traveling along a second portion of the infeed conveyor coextensive with a part of the removal conveyor and part of a carrier takeaway conveyor;

FIG. 11 shows the carrier having changed direction again and traveling along the carrier takeaway conveyor, with the pallet traveling along the removal conveyor toward a pallet takeaway conveyor;

FIG. 12 shows the pallet transferred to the pallet takeaway conveyor and the carrier further along the carrier takeaway conveyor;

DETAILED DESCRIPTION

Figure 1:
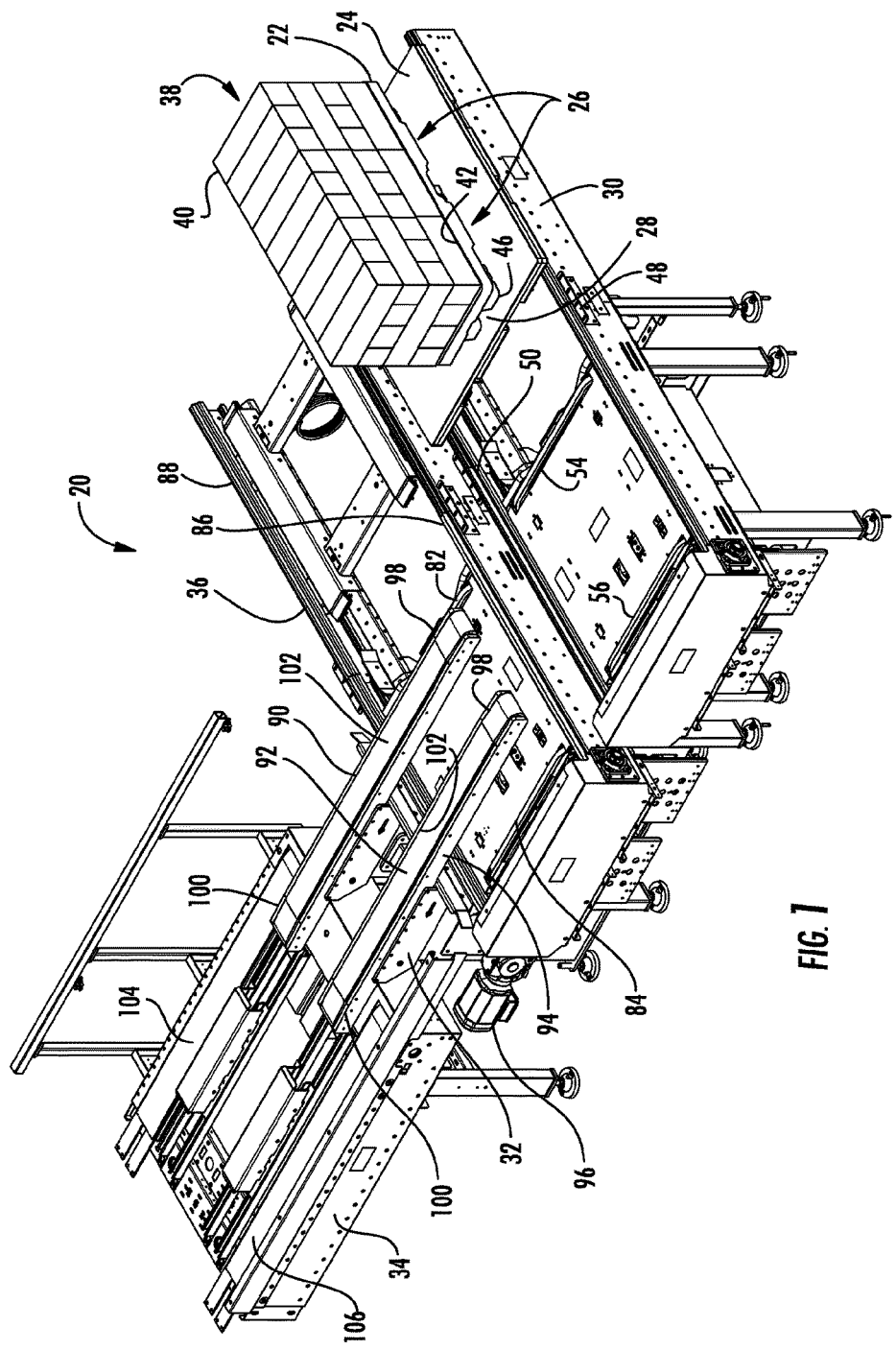
FIG. 1 is a perspective view of one system for removing pallets from carriers according to certain aspects of the disclosure.
Figure 2:
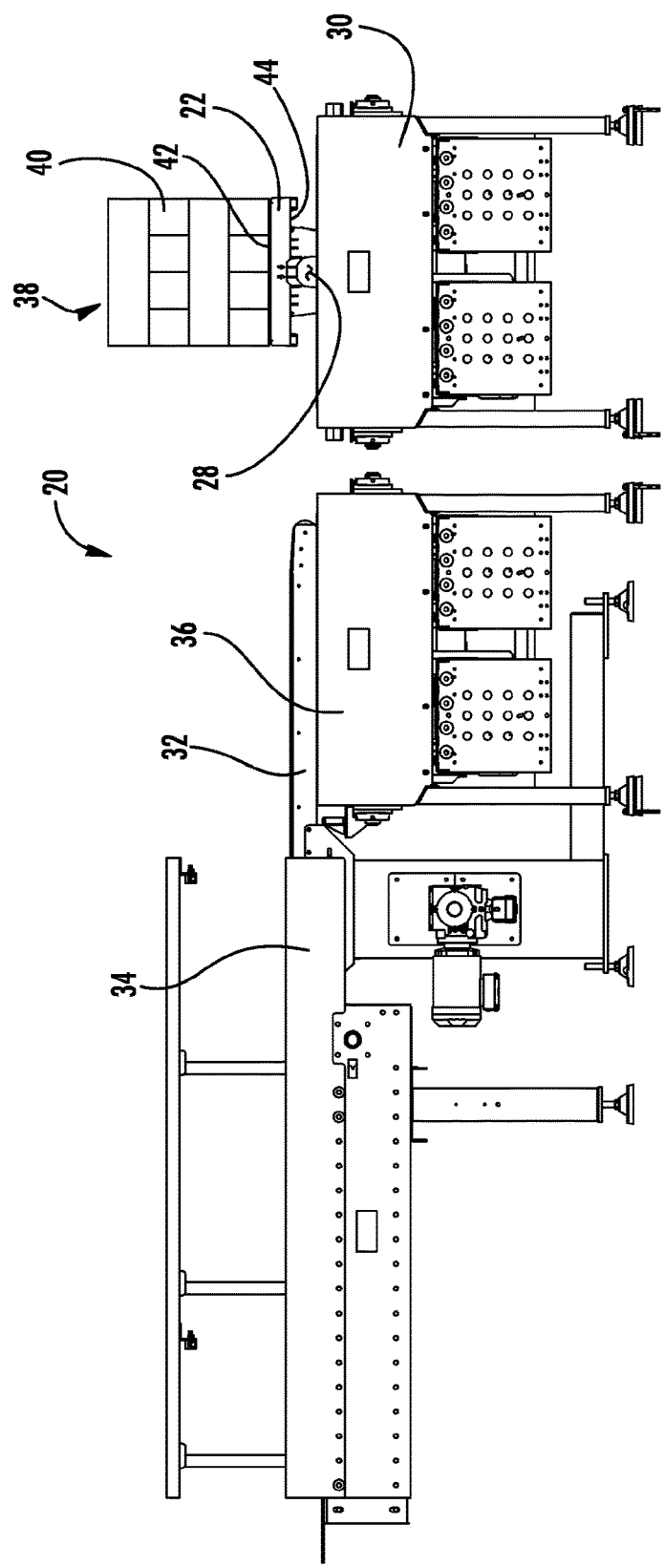
FIG. 2 is a side view of the system of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1-12 show an example of a system 20 for removing pallets 22 from carriers 24. System 20 includes generally an infeed conveyor 30, a removal conveyor 32, a pallet takeaway conveyor 34, and a carrier takeaway conveyor 36. The conveyors can each include one or more chains, belts or the like. The transporting structures of a given "conveyor" as that term is used herein can be located laterally adjacent each other across a line of travel, and also can be located along a line of travel. Accordingly, as used herein, the term "conveyor" is to be given a broad interpretation in accordance with the description below so as to include various driven and passive structures used to transfer articles along a path extending in one or more directions. Therefore, as set forth below, a "conveyor" as used herein is not to be limited to simply one or a pair of driven belts, chains or the like.

Infeed conveyor 30 receives palletized items downstream of a conventional pallet load building area (not shown). Carriers 24 carry pallets 22 which in turn carry loads 38 formed of one or more items 40. The items 40 can be placed on pallets 22 in conventional fashion in one or more layers as desired for a given shipment. Also, if desired, loads 38 may be stretch or shrink wrapped, banded, etc. (not shown) to hold them together and in place on pallets 22. Accordingly, there is no limitation as to the types or arrangements of individual items 40 within loads 38 on pallets 22 using the present system. Items 40/loads 38 are shown herein only in FIGS. 1 and 2 for clarity, but it should be understood that most or all of pallets 22 throughout system 20 would generally be carrying loads during use.

As illustrated, pallets 22 have a top surface 42 on which loads 38 rest and a bottom side 44 having a bottom edge 46 that can rest on another surface such as the tops of carriers 24. Widthwise and lengthwise grooves 26 and 28 are defined in bottom sides 44 of pallets 22.

Figure 14:
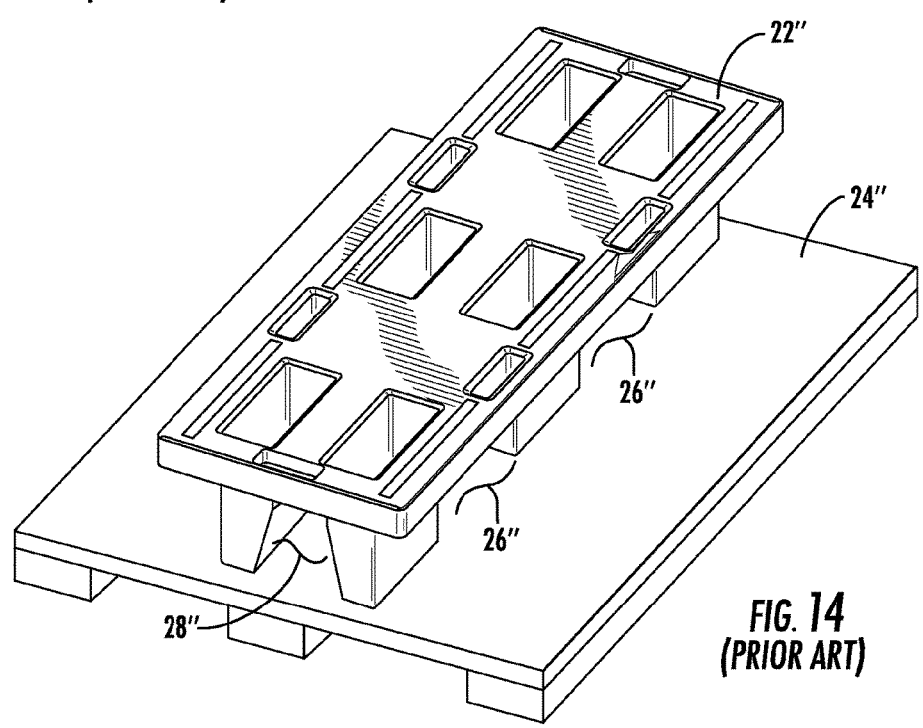
FIG. 14 is a perspective view of another conventional pallet on a conventional carrier.

As illustrated, pallet 22 handled by system 20 is similar to pallet 22" of FIG. 14. However, pallet 22 is merely an example of one possible article holder suitable for use with system 20. It should be understood that pallets 22 may have differing designs than those shown. Accordingly, the pallets may have zero, one, two, or more widthwise and/or lengthwise grooves. Although system 20 as illustrated is particularly useful with conventional "half-pallets" carried on conventional "carrier boards," substantial variation in the pallets and/or the carriers is possible. Thus, the pallets employed by system 20 need not be substantially rectangular or "half-pallets." Substantially square conventional pallets can also be successfully handled using system 20 with minor modifications so as to accept pallets and perhaps carriers of differing sizes. Accordingly, use of the term "pallet" herein and in the claims refers to an article holder/pallet of any size, not just a rectangular "half-pallet." Also, pallets 22 need not be unitarily-formed, molded plastic objects as shown. Pallets could instead be formed of assembled plastic or wooden pieces, or formed of other materials or combinations of materials if desired. Similarly, carriers 24 are illustrated as being similar to carriers 24' and 24" comprising substantially square elements (plywood sheets) with thin underlying additional sheet portions or boards as supports. However, carriers 24 need not be the substantially square wooden carrier boards with underlying supports, as shown. Carriers 24 could be other shapes, and could also be formed of other materials or combinations of materials, and could be formed unitarily or assembled.

As illustrated, infeed conveyor 30 may include a conveyor portion that conveys carriers 24 and pallets 22 in a first direction (from upper right to lower left as shown in FIG. 1). The conveyor portion may include two driven chains 48,50 located at lateral edges of the frame of conveyor 30. Carrier 24 rests on chains 48,50 so that the chains move the carrier 24, pallet 22 and load 38 together. At least one drive device 52, such as an electric motor which may be a servo motor or other type of motor, is used to drive chains 48,50. Drive device(s) 52 (shown representationally in FIG. 3) can be located and oriented by one skilled in the art as needed and in locations convenient within the frame of infeed conveyor 30 suitable for the particular application.

Figure 3:
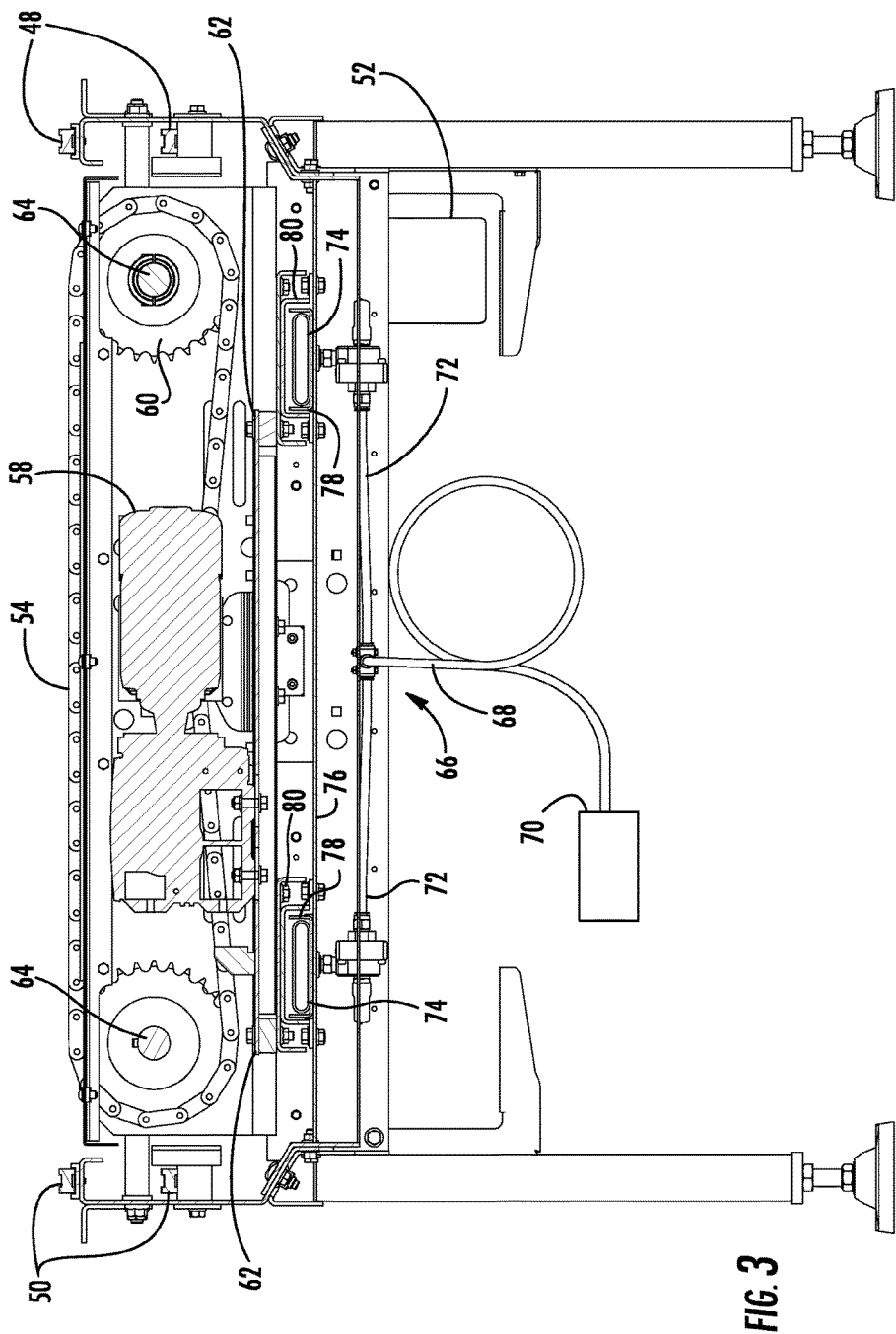
FIG. 3 is a side view of an infeed conveyor of the system of FIG. 1, showing a second portion in a lowered position relative to a first portion.
Figure 4:
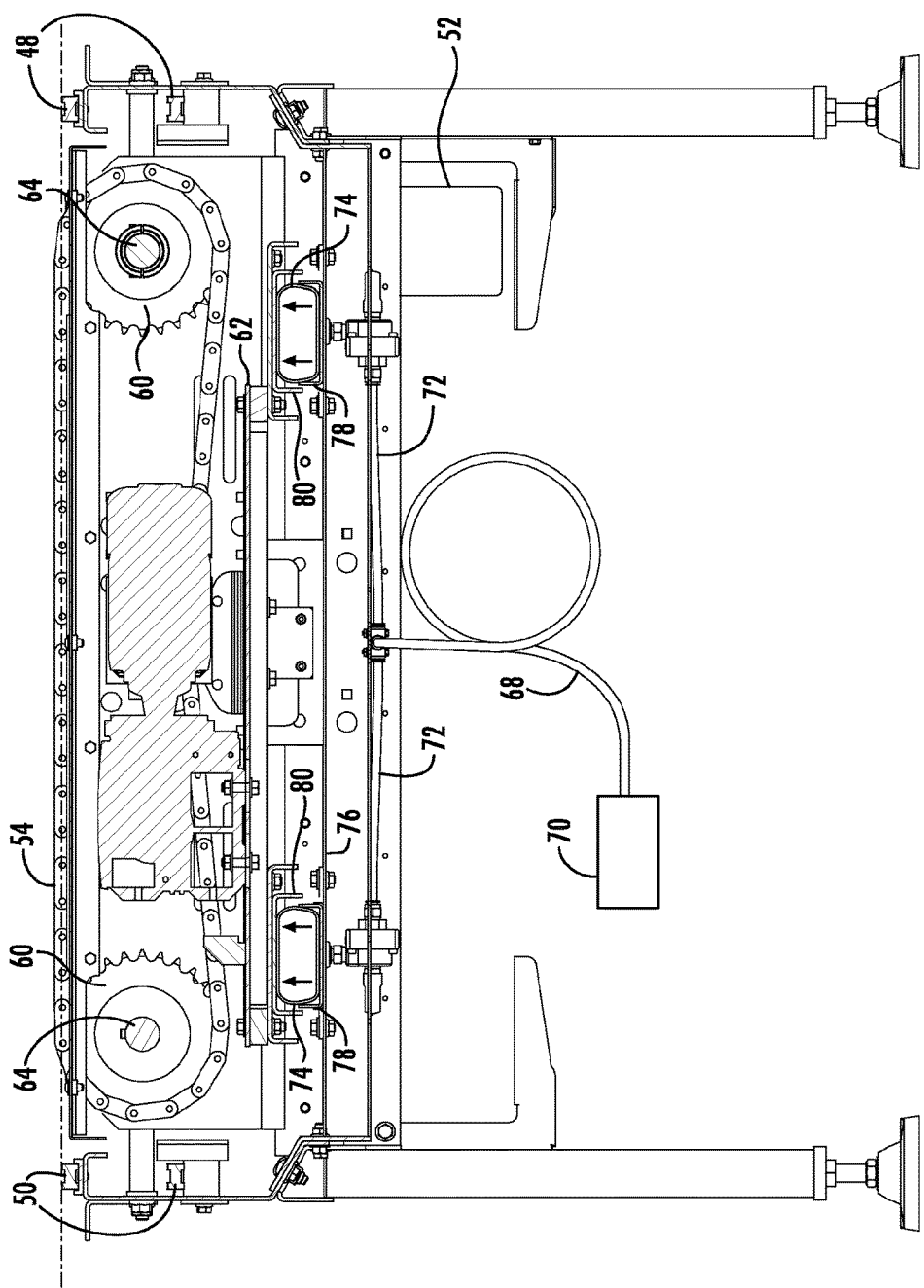
FIG. 4 is a side view of the infeed conveyor as I n FIG. 3, except that the second portion is in a raised position relative to a first portion.
Figure 5:
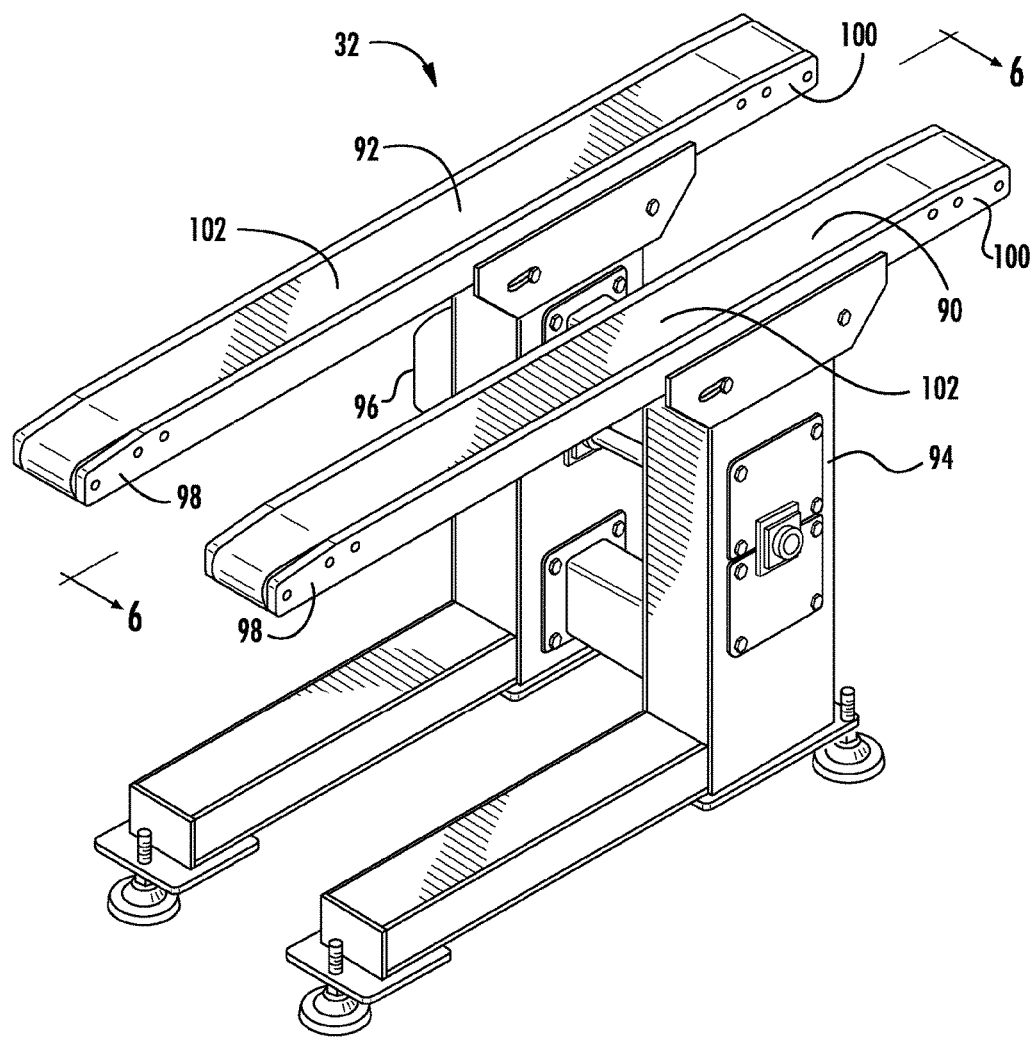
FIG. 5 is a perspective view of one possible the removal conveyor of the system of FIG. 1.
Figure 6:
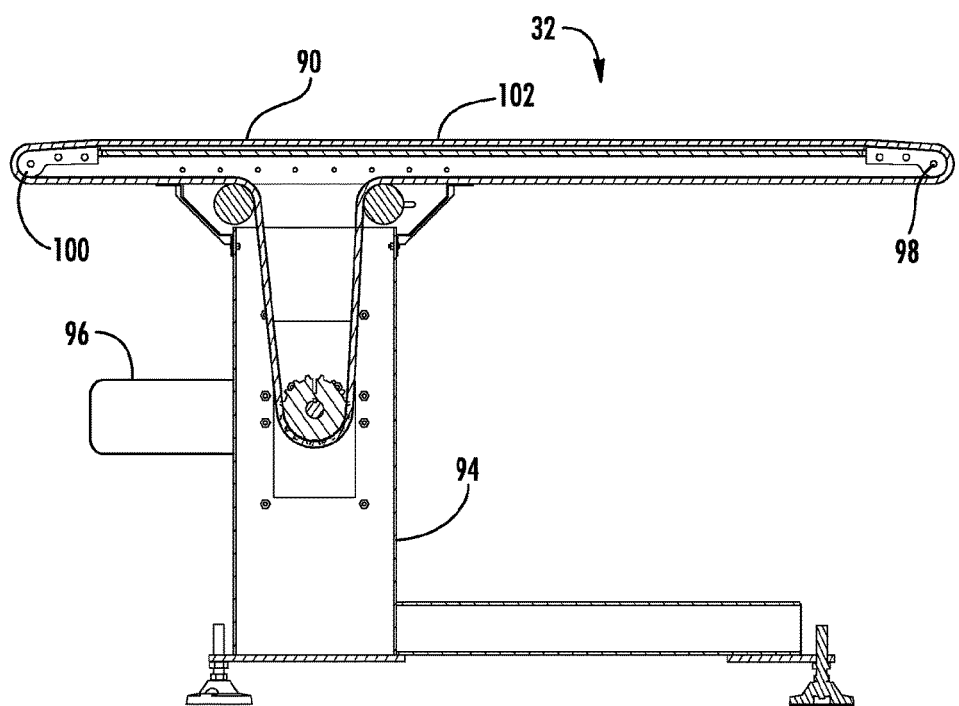
FIG. 6 is a side diagrammatic view of the removal conveyor taken along lines 6-6 of FIG. 5.

Infeed conveyor 30 also may include another conveyor portion that conveys carriers 24 and pallets 22. This conveyor portion may optionally convey the carriers and pallets in a second direction (from lower right to upper left as shown in FIG. 1). As shown, chains 54,56 are provided extending between and substantially perpendicular to chains 48,50. Chains 54,56 are driven by a drive device 58 within the frame of infeed conveyor 30. Drive device 58 may be a motor, as with device 52. FIG. 3 shows sprockets 60 around which chain 54 is driven. Sprockets 60 are rotatably mounted to a plate 62 via axles 64 and conventional bearings (not shown) functionally attached to the plate.

Plate 62 is liftable by a vertical movement mechanism 66 to thereby lift the top surface of chains 54,56. As shown, vertical movement mechanism 66 may be a pneumatic lifting device having a conduit 68 connected to a source of pressurized gas 70, such as a conventional electromechanical pneumatic cylinder (shown schematically). Conduit 68 is connected via a manifold 72 to at least one, in this case two, bladders 74. The bladders 74 each sit atop a base plate 76 within a respective guide channel 78, all within the frame of conveyor 30. An upper channel 80 is mounted to plate 62 above each bladder 74. Activation of source 70 to fill bladders 74 causes the bladders to change from the state of FIG. 3 to that of FIG. 4. Doing so, causes upper channels 80, plate 62 and ultimately sprockets 60 and chains 54,56 to lift to that the tops of chains 54,56 are slightly higher than the tops of chains 48,50.

If bladders 74 are inflated while a carrier 24 sits at the end of infeed conveyor 30 atop chains 48 and 50, chains 54 and 56 will lift the carrier off chains 48 and 50. In this way, a carrier can be driven to the end of infeed conveyor 30 by chains 48 and 50, those chains can be stopped, bladders 74 can be inflated thereby lifting the carrier onto chains 54 and 56, and then chains 54 and 56 can be driven to move the carrier off infeed conveyor 30 toward removal conveyor 32 and pallet takeaway conveyor 34. Once the carrier is moved off chains 54 and 56, bladders 74 can be deflated by opening a conventional relief valve or reversing pneumatic source 70. Chains 54 and 56 are thus dropped below chains 48 and 50, so that the next carrier can be driven to the end of infeed conveyor 30. It should be understood that if the carrier 24 has a nonplanar bottom surface, that chains 54 and 56 might not have to be lifted above chains 48 and 50, but simply lifted enough to engage and lift the carrier off chains 48 and 50.

It should be understood that vertical movement device 66 could instead by an active hydraulic device, a servo-motor driven device, etc., or a passive device such as camming surface or the like that change relative heights by virtue of movement of the chains, belts or other elements. Also, vertical movement device 66 could instead lower at least a portion of chains 48 and 50 relative to chains 54 and 56 to effect the transfer. Further, the transfer could be carried out without any vertical movement in some applications depending on the shape of the carrier bottom and/or the path of the carrier.

Carrier takeaway conveyor 36 is similar and arranged adjacent infeed conveyor 30. Carrier takeaway conveyor 36 includes two chains 82,84 that may be substantially aligned with chains 54,56 for moving a carrier 24 onto the carrier takeaway conveyor. Chains 82,84 may be vertically movable and lifted and lowered by a vertical movement mechanism (not shown) that may be similar to vertical movement mechanism 66. When a carrier is driven onto carrier takeaway conveyor 36, chains 82,84 are in a raised position substantially coplanar with chains 54,56. Once a carrier reaches a position so that the carrier is fully over the carrier takeaway conveyor 36, chains 82 and 84 may be lowered, and the carrier then comes to rest on chains 86 and 88. Chains 86,88 drive the carrier back to a location (toward the upper right in FIG. 1), where carriers are collected for reuse through the system. Chains 82,84,86,88 can be driven by drive devices such as motors (not shown) in a similar fashion as chains 48,50,54,56 above. As above, instead of raising chains 82,84, chains 86,88 may be lowered or other structures of mechanisms may be used to effect transfer of the carrier.

Removal conveyor 32 extends over carrier takeaway conveyor 36 and includes two belts 90,92 mounted to a frame 94. A drive device 96 is provided to drive belts 90,92. Removal conveyor 32 is located functionally in the system between infeed conveyor 30 and pallet takeaway conveyor 34. Removal conveyor 32 is shaped and configured for removing pallets 22 from carriers 24. Removal conveyor 32 transfers pallets 22 to pallet takeaway conveyor 34, and is driven in synchronicity with chains 54,56 of the infeed conveyor and chains 82,84 of carrier takeaway conveyor 36, so as to remove the pallets from the carriers with continuous motion.

Removal conveyor's belts 90,92 extend over carrier takeaway conveyor 36 spaced so that the belts will fit in widthwise grooves 26 of pallets 22. Removal conveyor 32 is configured with a number and spacing of belts to correspond to the structure of the pallet or pallets used by the system. Therefore, one or more than two belts may be used.

Optionally, the distal ends 98,100 of belts 90,92 and the frame portion supporting them may be configured so that the cross-sectional heights of the belts at the end locations are slightly less than along the center 102 of the belts. The reduced height at the ends 98,100 assists in moving pallets on to and off belts 90,92 without additional passive or active components, which could be substituted in some applications if desired. In particular, the reduced height at end 98 acts as a removal portion for lifting a pallet 22 off a carrier 24 as the carrier is being driven by chains 54,56,82,84. Similarly, the reduced height at end 100 acts as a return portion to allow a pallet 22 to be lowered onto belts 104,106 of pallet takeaway conveyor 34, where separated pallets and loads will be further handled (e.g., lifted by forklift to be placed into a truck, etc.). Belts 104,106 can also be driven in synchronicity with chains 54,56,82,84 and belts 90,92 to provide continuous motion through the system from end of infeed conveyor 30 onward.

Although removal conveyor 32 is illustrated as having a separate frame 94 from carrier takeaway conveyor 36 and pallet takeaway conveyor 34, it should be understood that the various conveyors of system 20 could instead be combined or integrated in various ways within the scope of the invention. Similarly, infeed conveyor 30 and carrier takeaway conveyor 36 could be combined into a single frame that incorporates both functions. Thus, the use of the term conveyor herein is intended to indicate a movement of goods, not a separate frame or structure.

Figure 7:
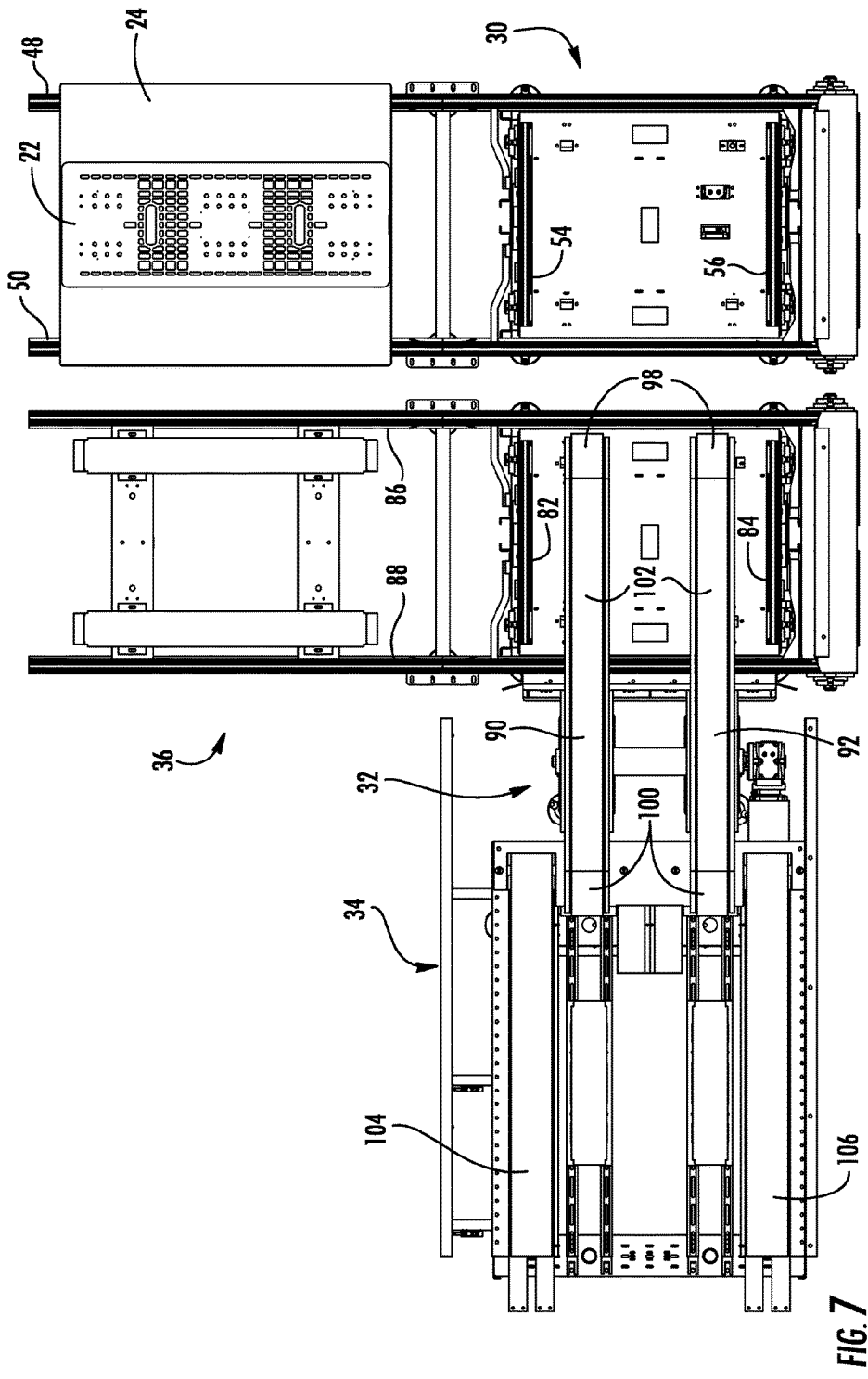
FIG. 7 is a top view of the system of FIG. 1.
Figure 8:
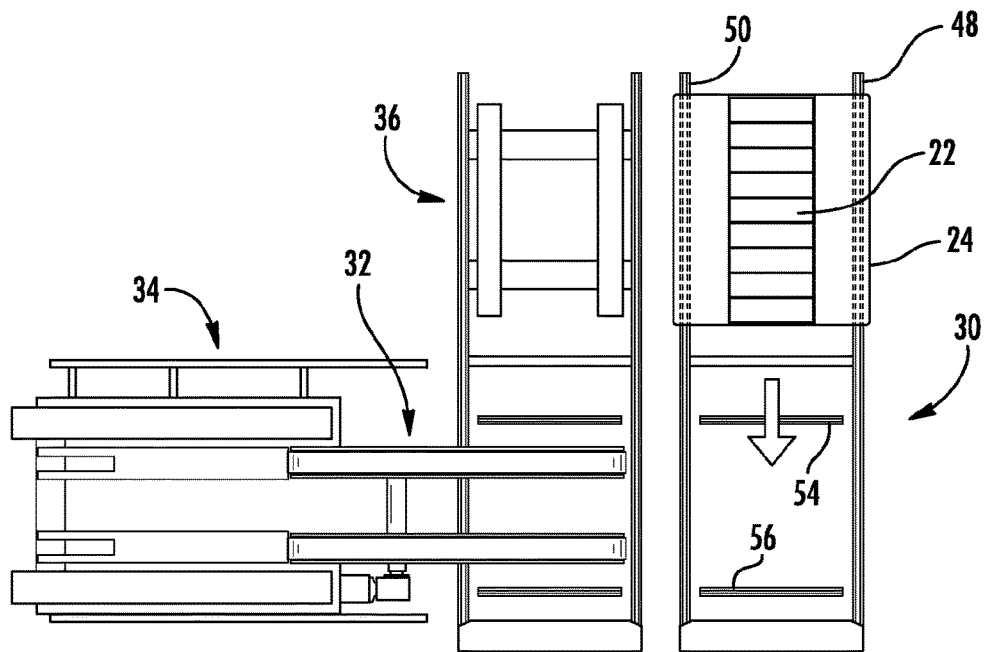
Figure 9:
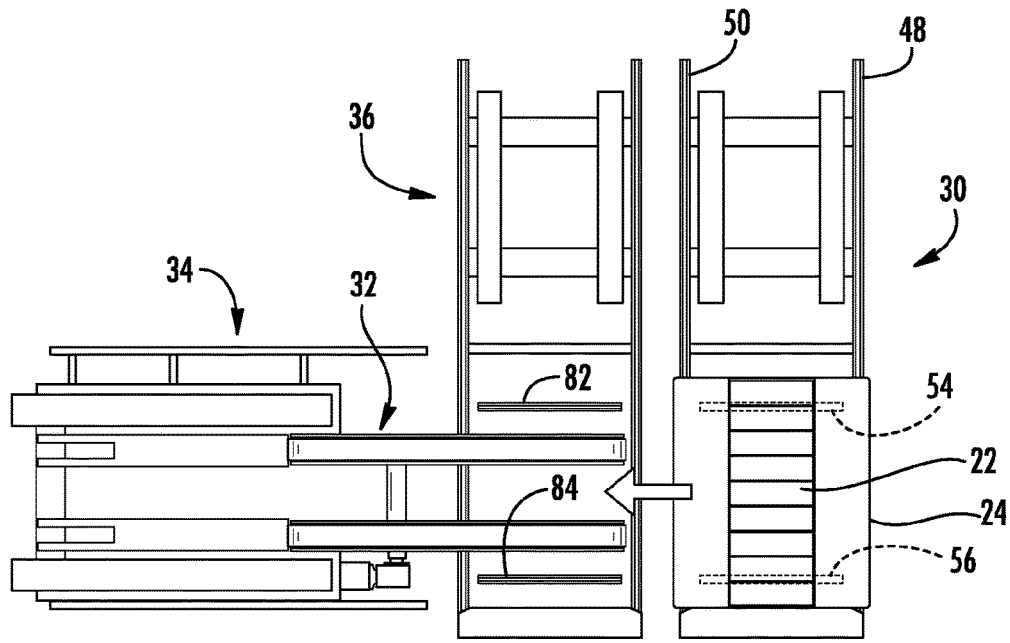

FIG. 7 shows a top view of system 20 in which the conveyors 30,32,34,36 and their respective chains and belts are again identified. FIGS. 8-12 are simplified views showing one cycle in which a carrier 24 and pallet 22 are moved through system 20 according to certain method of use aspects of the disclosure. In FIG. 8, the carrier 24 and pallet 22 enter system from the upper right (as shown) as chains 48,50 are being driven. When carrier 24 and pallet 22 reach the position of FIG. 9, the vertical movement mechanism moves from the state of FIG. 3 to the state of FIG. 4 to thereby lift chains 54,56 to a position so that carrier 22 will be supported by chains 54,56. Chains 48,50 may stop at this point or more preferably may continue to be driven as further carriers are likely being provided upstream along chains 48,50. Similarly, chains 54,56 may be driven as needed or continuously, depending on desired flow, wherein the relative heights of the adjacent chains determine which chains are contacting and moving a carrier at a given moment.

Figure 10:
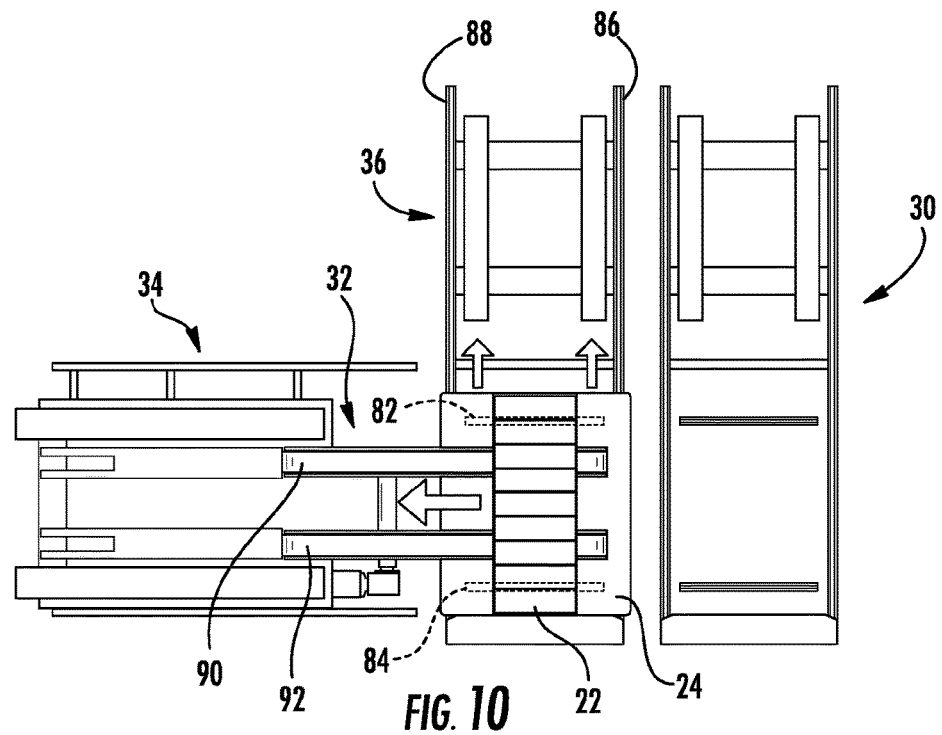

Once chains 54 and 56 contact carrier 24, the carrier and load 22 are driven by chains 54,56 and then chains 82,84 onto the position of FIG. 10. Once carrier 24 gets to the position of FIG. 10, the carrier transitions to be supported by chains 86,88. To do so, chains 82,84 are lowered by the vertical movement mechanism in carrier takeaway conveyor 36. Again, other vertical movement steps may be carried out by alternate methods and structures, as noted above. The various chains may or may not be stopped during the transfer and vertical movement. Carrier 24 now rests on chains 86,88 which drive the carrier away. Pallet 22 now rests on belts 90,92 which drive the pallet away.

Figure 11:
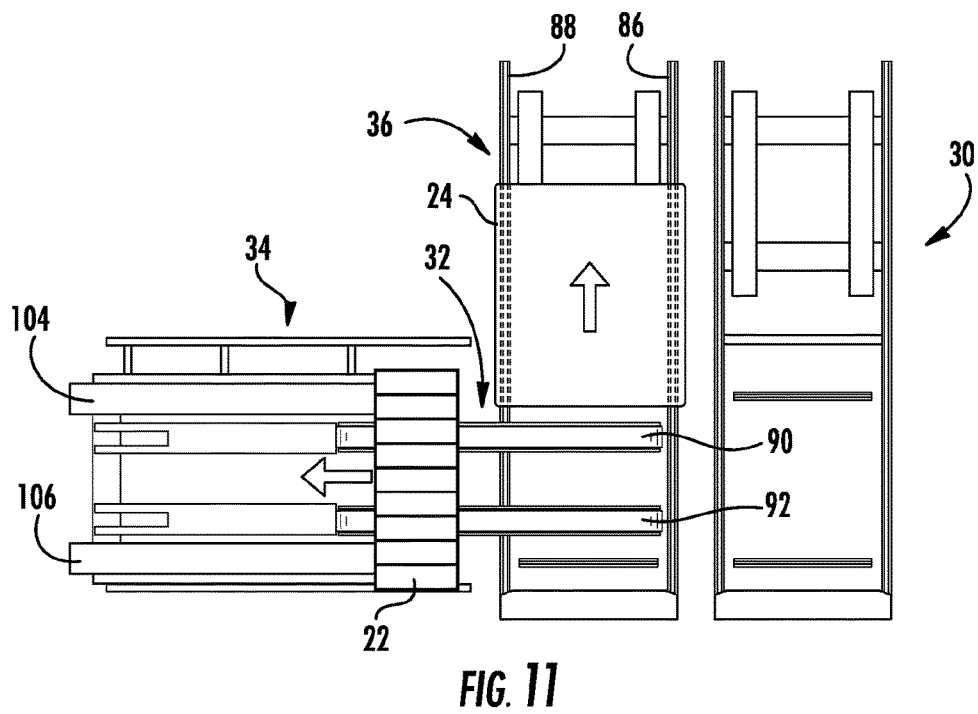
Figure 12:
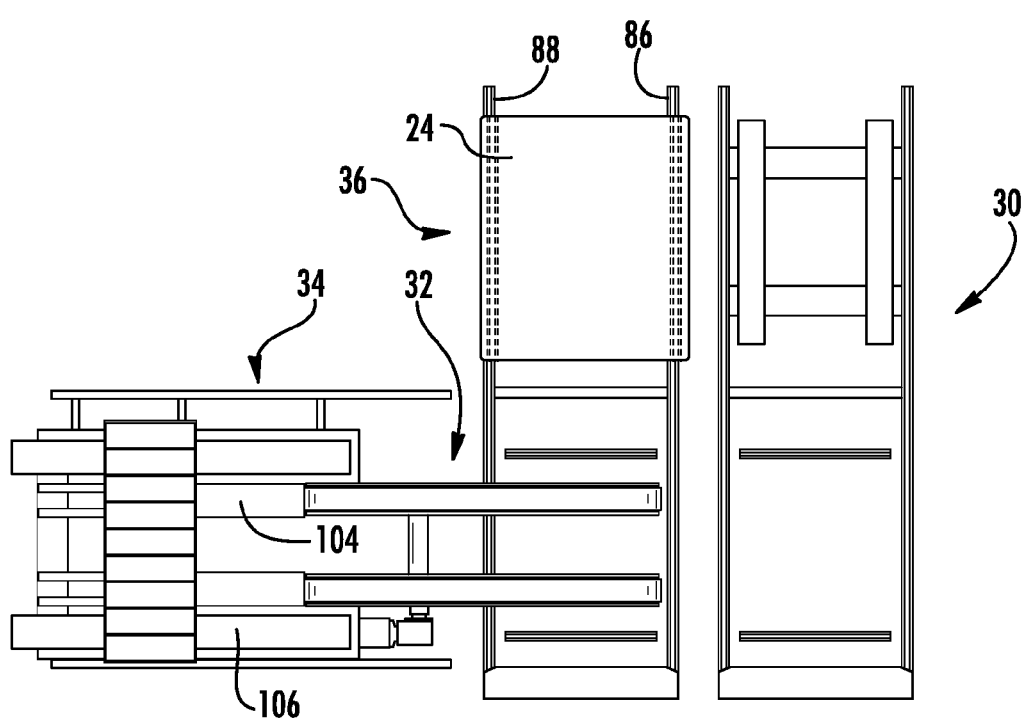
Figure 13:
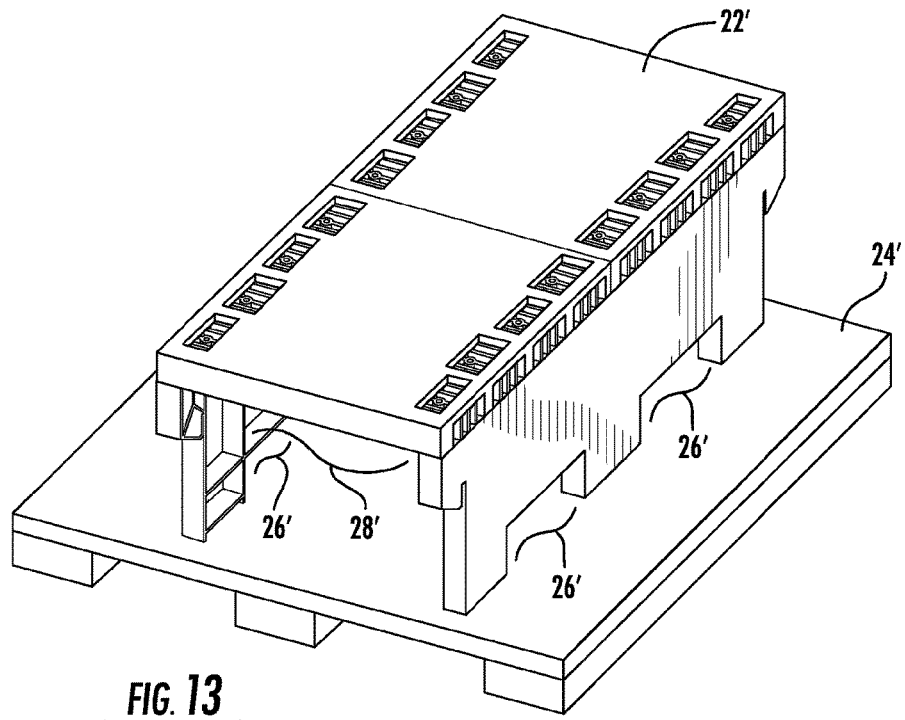
FIG. 13 is a perspective view of one conventional pallet on a conventional carrier.

FIG. 11 shows pallet 22 moving along belts 90,92 of removal conveyor 32 and onto belts 104,106 of pallet takeaway conveyor 34. FIG. 11 also shows carrier 24 moving along chains 86,88. FIG. 12 shows carrier 24 moved further along chains 86,88 and load 22 being carried only by belts 104,106.

Although this sequence shows only one load (pallet and carrier) moving through the system, it should be understood that multiple loads are being handled simultaneously and sequentially through the steps shown in FIGS. 8-12. Thus, a second pallet and carrier can be moving along infeed conveyor 30 closely behind a first, with the spacing determined by the speeds of the chains and belts and the orientation of the vertical movement mechanisms that selectively activate certain chains. For example, a second carrier and pallet can start moving laterally on chains 54,56 at or about the point shown in FIG. 11 where a first carrier and pallet have been separated and are moving along respective chains 86,88 and belts 90,92. Thus, once a first carrier clears chains 82,84, those chains can be moved again to receive a second carrier. Speeds of carriers and pallets though the system may be limited by the size, orientation and type of loads, the characteristics of the pallets or other factors, of course. By synchronizing chains and belts and utilizing vertically movable chains to activate or deactivate a given area of the system, a substantially continuous flow through the system can be provided with few or at least fewer load starts and stops than in other available systems. In particular, by using removal conveyor 32 synched between other conveyors to remove pallets from carriers with continuous motion, more moves per hour are possible, and load stability is increased.

The overall system can be controlled by a conventional PLC, such as those manufactured by Allen-Bradley. Various conventional position and condition sensors can also be employed, such as contact, infra-red, visual, ultra-sonic, etc. In particular, sensors can be employed to detect a carrier at the downstream end of the infeed conveyor, the upstream end of the pallet takeaway conveyor, removal conveyor or carrier takeaway conveyor, etc. These sensors can be used to generate signals sent to the PLC from which the PLC can employ program-based logic and algorithms to determine if a belt or chain should be started or stopped, if a vertical movement mechanism should be activated, etc., and send signals accordingly to the motors. The sensors can also generate signals based on flow rate, or on a stoppage or backup in the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A system for removing pallets from carriers comprising:
    an infeed conveyor configured for conveying carriers with pallets on the carriers;
    a pallet takeaway conveyor configured for conveying pallets;
    a removal conveyor between the infeed conveyor and the pallet takeaway conveyor configured for removing the pallets from the carriers and transferring the pallets to the pallet takeaway conveyor, the removal conveyor driven in synchronicity with at least a portion of the infeed conveyor so as to remove the pallets with continuous motion; and
    wherein the infeed conveyor includes a first portion that conveys the carriers and pallets in a first direction perpendicular to a direction of movement of the removal conveyor and a second portion that conveys the carriers and pallets in a second direction parallel to the direction of movement of the removal conveyor.

2. The system of claim 1, wherein the removal conveyor includes two parallel belts that include removal portions sized to fit between the carriers and the pallets.

3. The system of claim 2, wherein the pallets have bottom sides defining two parallel widthwise grooves, the parallel belts spaced so as to fit within the grooves.

4. The system of claim 1, further including a carrier takeaway conveyor configured for conveying carriers away from the removal conveyor after the removal conveyor has removed the pallets from the carriers.

5. The system of claim 4, wherein the carrier takeaway conveyor conveys the carriers in a direction perpendicular to a direction of movement of the removal conveyor.

6. The system of claim 1, wherein the removal conveyor is configured to lift the pallets off the carriers in a widthwise orientation across the removal conveyor.

7. The system of claim 6, wherein the removal conveyor includes two parallel belts that include removal portions sized to fit between the carriers and the pallets.

8. The system of claim 7, wherein the pallets have bottom sides defining two parallel widthwise grooves, the parallel belts being spaced so as to fit within the grooves.

9. The system of claim 1, wherein the removal conveyor is configured to carry pallets having a length and a width, the length more than twice the width.

10. A conveyor for removing a pallet from a carrier, the pallet having a bottom side defining two spaced-apart grooves, the conveyor comprising:
    a frame;
    a first belt mounted on the frame;

a second belt mounted on the frame;

the first and second belts each having a width sized to fit within a respective one of the grooves, the first and second belts each driven along paths including a lifting portion, the lifting portions extending parallel to each other and spaced apart so that the lifting portions can simultaneously fit within the grooves; and a drive for driving the first and second belts so as to support the pallet on the first and second belts and remove it from the carrier.

11. The conveyor of claim 10, wherein the lifting portions each have an upstream end that defines a height less than a distance between the pallet and the carrier within the grooves when the pallet sits atop the carrier.

12. The conveyor of claim 11, wherein the lifting portions each have a central portion spaced from the upstream end that defines a height greater than the distance.

13. A method of removing pallets from carriers including:

transporting pallets atop carriers on a first conveyor driven at a first speed;

removing the pallets from the carriers using a using a removal conveyor driven at a speed substantially the same as the speed of at least a portion of the first conveyor; and transferring the pallets from the removal conveyor to a load takeaway conveyor.

14. The method of claim 13, further including transferring the carriers from the first conveyor to a carrier takeaway conveyor.

15. The method of claim 13, wherein the removal conveyor includes two parallel belts that include removal portions sized to fit between the carriers and the pallets.

16. The method of claim 15, wherein the infeed conveyor includes at least one infeed belt extending parallel to and at least partially adjacent to the belts of the removal conveyor.

17. The method of claim 16, wherein the at least one infeed belt is located along a portion of the pallet takeaway conveyor.

18. The method of claim 17, wherein the at least one infeed belt has a portion selectively movable vertically to engage or disengage the carrier.

19. The method of claim 15, wherein the pallets have bottom sides defining two parallel widthwise grooves, the parallel belts spaced so as to fit within the grooves.

20. The method of claim 13, wherein the first conveyor includes a first portion that conveys the carrier boards and pallets in a first direction perpendicular to a direction of movement of the removal conveyor and a second portion that conveys the carrier boards and pallets in a second direction parallel to the direction of movement of the removal conveyor.

21. The method of claim 13, wherein the removal conveyor is configured to lift the pallets off the carriers in a widthwise orientation across the removal conveyor.

22. The method of claim 21, wherein the removal conveyor includes two parallel belts that include removal portions sized to fit between the carriers and the pallets.

\* \* \* \* \*